(12) United States Patent
Kuroyanagi et al.

(10) Patent No.: US 8,371,330 B2
(45) Date of Patent: Feb. 12, 2013

(54) VALVE DEVICE

(75) Inventors: Munetoshi Kuroyanagi, Aichi-Ken (JP); Hiroaki Suzuki, Nagoya (JP); Toshikatsu Kubo, Okazaki (JP)

(73) Assignee: JTEKT Corporation, Osaka (JP)

( * ) Notice: Subject to any disclaimer, the term of this patent is extended or adjusted under 35 U.S.C. 154(b) by 446 days.

(21) Appl. No.: 12/706,460

(22) Filed: Feb. 16, 2010

(65) Prior Publication Data

US 2010/0206403 A1   Aug. 19, 2010

(30) Foreign Application Priority Data

Feb. 17, 2009   (JP) .................................. 2009-034294

(51) Int. Cl.
| | |
|---|---|
| F16K 15/00 | (2006.01) |
| F16K 17/00 | (2006.01) |
| F16K 21/04 | (2006.01) |
| E03B 3/18 | (2006.01) |
| E03B 7/07 | (2006.01) |
| F02M 37/22 | (2006.01) |

(52) U.S. Cl. ................. 137/512.3; 137/533.11; 137/549
(58) Field of Classification Search .................. 137/512, 137/512.3, 512.5, 533.11, 533.19, 533.17, 137/534, 544–547, 549, 550, 613
See application file for complete search history.

(56) References Cited

U.S. PATENT DOCUMENTS

| | | | |
|---|---|---|---|
| 32,797 A | 7/1861 | Stebbins | |
| 1,800,066 A * | 4/1931 | Glass ....................... | 137/516.11 |
| 1,810,621 A | 6/1931 | Parks | |
| 1,960,335 A * | 5/1934 | Finnie et al. ................... | 210/117 |
| 2,306,012 A * | 12/1942 | Campbell ..................... | 137/512 |
| 2,677,939 A * | 5/1954 | Clute ............................ | 137/389 |
| 2,949,930 A * | 8/1960 | Moore, Jr. et al. ........ | 137/516.29 |
| 3,097,660 A * | 7/1963 | Priesmeyer ................... | 137/316 |
| 3,552,421 A | 1/1971 | Yocum | |
| 3,698,411 A * | 10/1972 | Garrett ............................ | 137/71 |
| 3,945,604 A | 3/1976 | Clarkson | |
| 4,917,355 A | 4/1990 | Dark et al. | |

(Continued)

FOREIGN PATENT DOCUMENTS

| | | |
|---|---|---|
| JP | A-9-210296 | 8/1997 |
| JP | A-2006-144841 | 6/2006 |

OTHER PUBLICATIONS

New U.S. Patent Application filed Feb. 16, 2010 in the name of Suzuki et al.

(Continued)

*Primary Examiner* — John Rivell
*Assistant Examiner* — Hailey K Do
(74) *Attorney, Agent, or Firm* — Oliff & Berridge, PLC

(57) ABSTRACT

A valve device is installed on a gas tank and opens and closes a gas filling passage. The valve device includes: a housing having a housing portion therein; a first check valve that is fixed to the housing and has a through hole, through which the housing portion and the filling passage communicate with each other; and a valve pressing member. The housing has a filling port, through which the outside and the housing portion communicate with each other. The housing portion contains a filter, disposed between the filling port of the housing and the through hole of a passage member, and a valve element that is moved between the filter and the filling port by the flow of gas. When the gas in the gas tank flows into the housing portion, the valve element moved toward the filling port seats on a valve seat and closes the filling port.

20 Claims, 3 Drawing Sheets

U.S. PATENT DOCUMENTS

| | | | |
|---|---|---|---|
| 5,106,055 | A | 4/1992 | Phillips |
| 5,267,585 | A | 12/1993 | Jones |
| 5,292,105 | A | 3/1994 | Velimirovic |
| 5,295,661 | A | 3/1994 | Roussel |
| 5,813,429 | A | 9/1998 | Ohtaka et al. |
| 5,992,444 | A | 11/1999 | Junttila |
| 6,422,535 | B1 | 7/2002 | Stone et al. |
| 2009/0108225 | A1 | 4/2009 | Kubo et al. |
| 2009/0146094 | A1 | 6/2009 | Suzuki et al. |
| 2009/0283154 | A1 | 11/2009 | Suzuki et al. |
| 2009/0283165 | A1 | 11/2009 | Nakata et al. |
| 2009/0285650 | A1 | 11/2009 | Numazaki et al. |
| 2009/0288723 | A1 | 11/2009 | Numazaki et al. |
| 2009/0308465 | A1 | 12/2009 | Suzuki et al. |
| 2010/0163121 | A1* | 7/2010 | Choi .................... 137/489.3 |

OTHER PUBLICATIONS

Office Action dated Apr. 6, 2012 in U.S. Appl. No. 12/706,316.
Office Action dated Jul. 6, 2012 from U.S. Appl. No. 12/706,316.
Office Action dated Nov. 26, 2012 from U.S. Appl. No. 12/706,316.

* cited by examiner

VALVE DEVICE

INCORPORATION BY REFERENCE

The disclosure of Japanese Patent Application No. 2009-032294 filed on Feb. 17, 2009 including the specification, drawings and abstract is incorporated herein by reference in its entirety.

BACKGROUND OF THE INVENTION

1. Field of the Invention

The invention relates to a valve device that is used for a gas tank, which, in particular, is a gas tank that stores high-pressure gas.

2. Description of the Related Art

In general, a gas tank that stores high-pressure gas is provided with a valve device that interrupts the flow of the gas in a passage, through which the inside of the gas tank and the outside thereof communicate with each other. See Japanese Patent Application Publication No. 9-210296 (JP-A-9-210296), for example.

With regard to a gas tank for hydrogen gas mounted on a fuel cell vehicle or the like, development to achieve higher pressure resistance is in progress to increase the storage capacity. The storage pressure of hydrogen gas becomes higher and higher from 30 MPa to 50 MPa and to 70 MPa. Thus, it is desired that the gas tank be highly reliable so that gas leakage does not occur even under high-pressure conditions and have a highly accurate pressure regulation performance. In a passage for filling hydrogen gas into a gas tank, a check valve for preventing the stored hydrogen gas from flowing backward is provided in addition to a manual valve. For example, in order to secure the reliability, a valve device, in which multiple check valves are used, has been proposed.

In the valve device described in Japanese Patent Application Publication No. 2006-144841 (JP-A-2006-144841), a housing recess portion that opens at an outer side of a plug housing is formed and a manual valve is screwed into the housing recess portion. A plurality of check valves are arranged between the manual valve and the housing recess portion to reduce the size. In such a valve device, in which the check valve(s) are disposed in the plug, it is desirable that the check valve be disposed in the filling port side of the gas filling passage in order to facilitate the installation of the check valve(s) into the plug.

However, in the vicinity of the filling port of the filling passage, a filter for preventing dust etc. from entering the inside of the gas tank when hydrogen gas is being filled is provided. Thus, in order to dispose the check valve and the filter in the filling port side of the filling passage, a large space is required.

SUMMARY OF THE INVENTION

A valve device according to an aspect of the invention is installed on a gas storing tank and opens and closes a gas filling passage. The valve device includes: a housing having a housing space therein; and a passage member that is fixed to the housing and has a through hole, through which the housing space and the filling passage communicate with each other. The housing has a filling port, through which the housing space and the outside of the valve device communicate with each other. The housing space contains a filter, disposed between the filling port of the housing and the through hole of the passage member, for filtering a gas that is filled into the gas tank through the filling port and a valve element that is moved between the filter and the filling port by the flow of the gas. When the gas in the gas tank passes through the through hole and the filter and flows into the housing space, the valve element moved toward the filling port seats on a valve seat formed around the filling port and closes the filling port.

In the above configuration, the housing space that contains the filter is formed in the housing that is attached to an external portion of the gas tank. The valve element is disposed between the filling port and the filter fixed in the housing space and the valve seat is formed around the filling port, so that the filter housing portion functions as a check valve. Specifically, when the gas is being filled, the valve element is moved toward the filter and comes apart from the valve seat at the filling port and on the other hand, when the gas flows backward, the valve element is pressed against the valve seat and seats thereon to close the filling port.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the invention will be described below with reference to FIG. 1. A gas tank 1 that stores high-pressure hydrogen gas is provided with a plurality of passages, through which the inside of the gas tank 1 communicates with the outside thereof, and a plurality of valve devices that control the flow of hydrogen gas in the passages. In the description of this embodiment, a valve device 2 that is provided for, among the above passages, a filling passage 3 for filling hydrogen gas into the gas tank 1 is described. The hydrogen gas and the valve element when hydrogen gas is being filled are represented by chain double-dashed lines. The hydrogen gas and the valve element when hydrogen gas flows backward are represented by solid lines.

Figure 1:
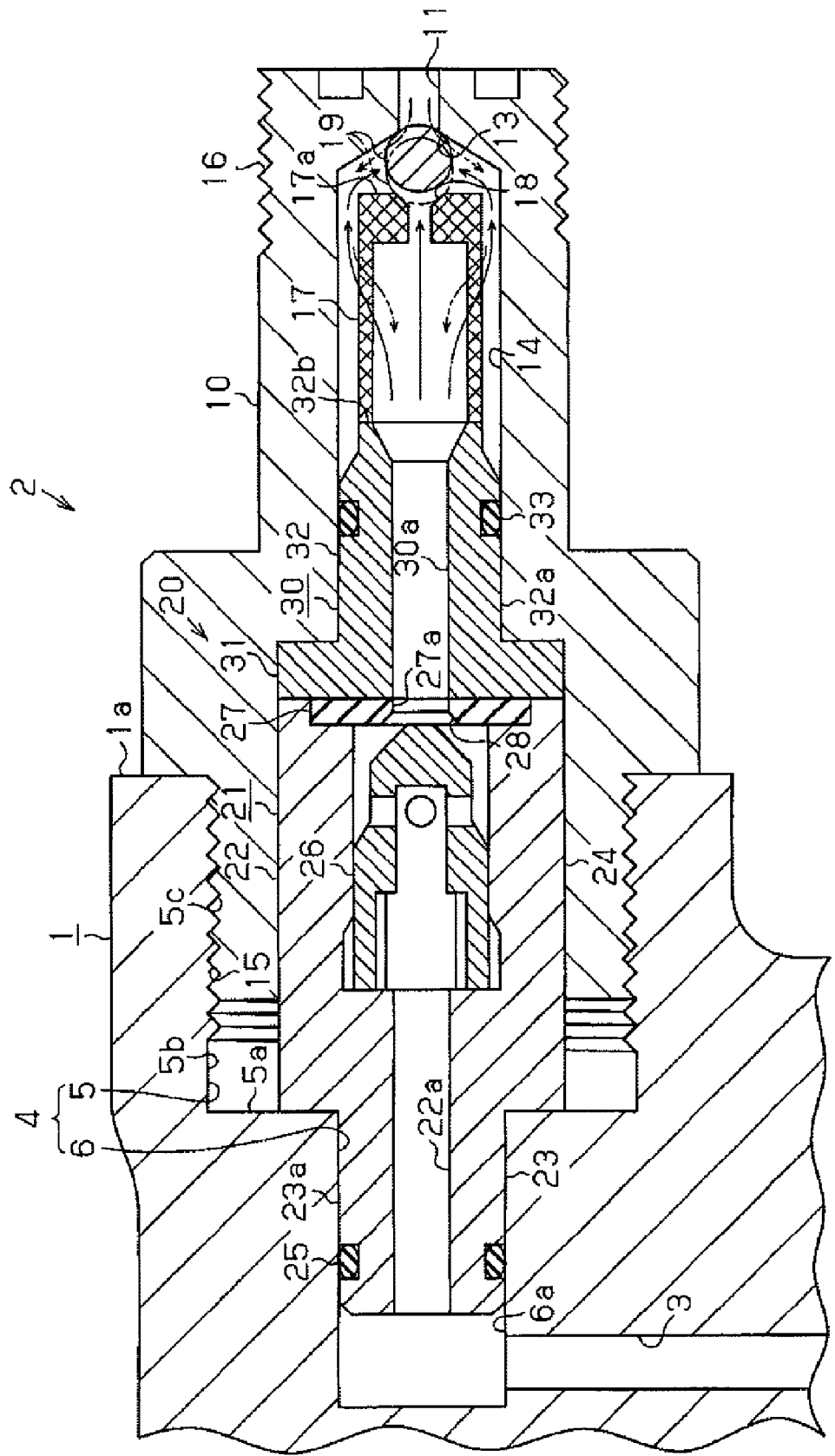
FIG. 1 is a sectional view showing a structure of a valve device according to a first embodiment.

As shown in FIG. 1, the gas tank 1 is provided with an installation recess portion 4 in an outer surface 1a. The filling passage 3 leads to the installation recess portion 4, and a cylindrical housing 10 is screwed into the installation recess portion 4. A passage member 20 that connects the filling passage 3 and a filling port 11 formed in the housing 10 is provided in the housing 10. A housing portion 14 that contains a filter 17 for preventing dust from entering the inside of the gas tank 1 through the filling port 11 is formed between the passage member 20 and the filling port 11 of the housing 10. The filter 17 is housed in the housing portion 14. A spherical valve element 19 is disposed between the filter 17 and the filling port 11. A valve seat 13, on which the spherical valve element 19 seats to close the filling port 11, is formed around the filling port 11 of the housing portion 14.

The installation recess portion 4 includes a first recess portion 5 that opens at the outer surface 1a of the gas tank 1 and a second recess portion 6 that is provided in a bottom surface 5a of the first recess portion 5. The filling passage 3 that leads to the inside of the tank is opened at a side surface 6a of the second recess portion 6. An internal screw portion 5c, into which an external screw portion 15 formed on the outer surface of the housing 10 is screwed, is formed in a side surface 5b of the first recess portion 5.

The passage member 20 is provided with a first check valve 21 and a valve pressing member 30 that presses the first check valve 21 at the time of installation. The first check valve 21 includes: a valve element housing 22 that has a shape of a cylinder having a bottom portion; a lid body 27 that closes an opening portion of the valve element housing 22; and a valve element 26 that is housed in the valve element housing 22 so as to be able to move in the axial direction of the valve element housing 22. The valve element housing 22 includes a small diameter portion 23 that has a diameter substantially equal to the inner diameter of the second recess portion 6 and a large diameter portion 24 that has a diameter greater than the outer diameter of the small diameter portion 23 and smaller than the inner diameter of the first recess portion 5.

Through holes 22a and 27a, through which the inside and the outside of the valve element housing 22 communicate with each other, are formed in the valve element housing 22 and the lid body 27, respectively. The through holes 22a and 27a are formed at the positions coaxial with the valve element 26 that is housed in the valve element housing 22. A valve seat 28 that the valve element 26 is brought into contact with and comes away from, is formed at the circumferential edge of the through hole 27a provided in the lid body 27. An O ring 25 is fitted onto an outer circumference 23a of the small diameter portion 23 of the valve element housing 22.

The filling passage 3 and the through hole 22a of the first check valve 21 communicate with each other. When the hydrogen gas in the gas tank 1 flows backward, the valve element 26 seats on the valve seat 28 due to the gas pressure, whereby the flow of the hydrogen gas from the first check valve 21 to the filling port 11 is interrupted.

The valve pressing member 30 includes: a pressing portion 31 that has a diameter equal to the outer diameter of the large diameter portion 24 of the valve element housing 22 and presses the lid body 27 of the first check valve 21 toward the valve element housing 22; and a fitting portion 32 that is fitted into the housing 10. A through hole 30a is formed in the valve pressing member 30 and is connected to the through hole 22a of the first check valve 21. An O ring 33 is fitted onto the outer circumferential surface 32a of the fitting portion 32. The filter 17 that has a shape of a cylinder having a bottom portion and is formed of metal mesh, for example, is fixed, by welding, to an end portion 32b of the valve pressing member 30 on the filling port 11 side. The spherical valve element 19 is disposed between the filter 17 and the filling port 11. A recess portion 18 that holds the spherical valve element 19 when hydrogen gas is filled is formed at an end portion 17a of the filter 17 on the filling port 11 side.

The fitting portion 32 of the valve pressing member 30 is fitted into the housing 10 and the housing portion 14 that houses the filter 17 and the spherical valve element 19 is formed in the housing 10. The portion of the housing portion 14 on the filling port 11 side slopes toward the filling port 11 so as to have a mortar shape. The external screw portion 15 that has a diameter substantially equal to the inner diameter of the first recess portion 5 and is screwed into the first recess portion 5 is formed on the outer circumferential surface of the portion of the housing 10 outside the valve element housing 22. The external screw portion 16, onto which the supply nozzle or the like (not shown) is screwed at the time of filling gas, is formed on the outer circumferential surface of the housing 10 on the distal end side. The valve seat 13 that the spherical valve element 19 is brought into contact with and comes away from, is formed at the inner edge of the filling port 11. When hydrogen gas flows backward, the spherical valve element 19 seats on the valve seat 13 in the housing portion 14 and thus functions as a check valve (hereinafter referred to as the second check valve), so that the hydrogen gas that passes through the filter 17 is prevented from leaking through the filling port 11.

The procedure for installing the valve device 2 to the gas tank 1 will be described below. First, the small diameter portion 23 of the first check valve 21 is fitted into the second recess portion 6 of the installation recess portion 4 that is formed in the outer surface 1a of the gas tank 1. As a result of this installation, the O ring 25 that is provided on the outer circumferential surface of the small diameter portion 23 is brought into close contact with the inner wall of the second recess portion 6, so that excellent sealing properties are ensured.

Next, the spherical valve element 19 is inserted into the housing portion 14 of the housing 10 and a member, into which the filter 17 and the valve pressing member 30 are united, is then inserted thereinto so that the filter 17 is positioned on the filling port 11 side. As a result of this installation, the O ring 33 that is provided on the outer circumferential surface of the fitting portion 32 is brought into close contact with the inner wall of the housing portion 14, so that excellent sealing properties are ensured.

The housing 10 that houses the spherical valve element 19, the filter 17, and the valve pressing member 30, is attached to the gas tank 1. The external screw portion 15 formed on the outer circumferential surface of the housing 10 on the first check valve 21 side is screwed into the internal screw portion 5c formed on the side surface 5b of the first recess portion 5 of the installation recess portion 4 of the gas tank 1 and the housing 10 is tightened up, whereby the first check valve 21 and the valve pressing member 30, which function as the passage member 20, are fixed in a pressed state.

Because the valve device 2 installed in this way is disposed as a unit externally on the gas tank 1, the space required for installation is small and the installation is easy.

Next, operation of the valve device 2 will be described. A nozzle for supplying hydrogen gas is screwed onto the portion of the filling port 11 and hydrogen gas is filled into the tank. When the hydrogen gas flows into the filling passage 3, the spherical valve element 19 is held on the recess portion 18 of the filter 17 due to the pressure of the inflow gas. The hydrogen gas that flows in through the filling port 11 detours the spherical valve element 19, passes through the filter 17, passes through the through hole 30a of the valve pressing member 30, passes through the first check valve 21, and is thus filled into the gas tank 1 through the through hole 22a of the valve element housing 22 and through the filling passage 3.

Meanwhile, when the vehicle equipped with the gas tank has an accident and an excessive pressure occurs in the gas tank 1 due to a collision or the like, for example, the hydrogen gas in the gas tank 1 flows backward, passes through the first check valve 21, and enters the housing portion 14 of the housing 10, in which the second check valve is provided. The hydrogen gas flows from a central area of the filter 17 toward the filling port 11, thereby pressing the spherical valve element 19 against the valve seat 13 of the filling port 11. Because the spherical valve element 19 closes the filling port 11, it is possible to prevent hydrogen gas from leaking to the outside through the filling port 11.

Operations and effects of the first embodiment will be summarized below.

(1) By forming the housing portion 14, which functions as the space that contains the filter 17, in the housing 10 that is attached to an external portion of the gas tank 1, it is possible to simplify the structure on the gas tank 1 side. In addition, by disposing the valve element between the filling port 11 and the filter 17 that is fixed in the housing portion 14 and forming the valve seat 13 at the filling port 11, it is possible to make the housing portion 14 function as the second check valve. During normal use, the valve element moves to the filter 17 side, away from the valve seat 13 of the filling port 11. When an abnormality occurs and the hydrogen gas flows backward, the valve element is pressed against the valve seat 13 and seats thereon, whereby the filling port 11 is closed. Thus, it is possible to simplify the valve device and reduce the size thereof. In addition, the first check valve 21 and the valve pressing member 30, which function as the passage member 20, are connected to the installation recess portion 4 so as to connect the filling port 11 and the filling passage 3, and the housing 10 is attached to the installation recess portion 4 in a state where the filter 17 and the valve element are installed in the valve pressing member 30, which functions as the passage member 20. Thus, the valve device 2 installed on the gas tank 1 is formed as a unit on an external portion of the gas tank 1, so that the space required for installation is reduced and the ease of installation is improved.

(2) The spherical valve element 19 is housed in the housing portion 14 of the housing 10 and the holding recess portion 18 is formed at the end portion 17a of the filter 17. When hydrogen gas is filled, for example, and the spherical valve element 19 therefore moves to the filter 17 side, the recess portion 18 holds the spherical valve element 19, so that unnecessary movement of the spherical valve element 19 is suppressed. In addition, a member for holding the spherical valve element 19 is not provided separately and the recess portion 18 for holding the spherical valve element 19 is provided on the filter 17, so that the space required for installation is reduced.

(3) Because the first check valve 21 and the valve pressing member 30 are fixed in a pressed state via the housing 10 to form the passage member 20, the first check valve 21 and the valve pressing member 30 are reliably connected to the filling passage 3 and it is possible to improve the sealing properties. Because the housing 10 is fixed to the installation recess portion 4 by screwing, it is easy to tighten up the housing 10.

(4) The first cheek valve 21 that is disposed in the passage member 20 and the housing portion 14 that functions as the second check valve are used to make the check valve double and the reliability in preventing gas leakage when hydrogen gas flows backward is improved. In addition, because the installation is performed by merely fixing the first check valve 21 and the valve pressing member 30, the installation is easy.

Figure 2:
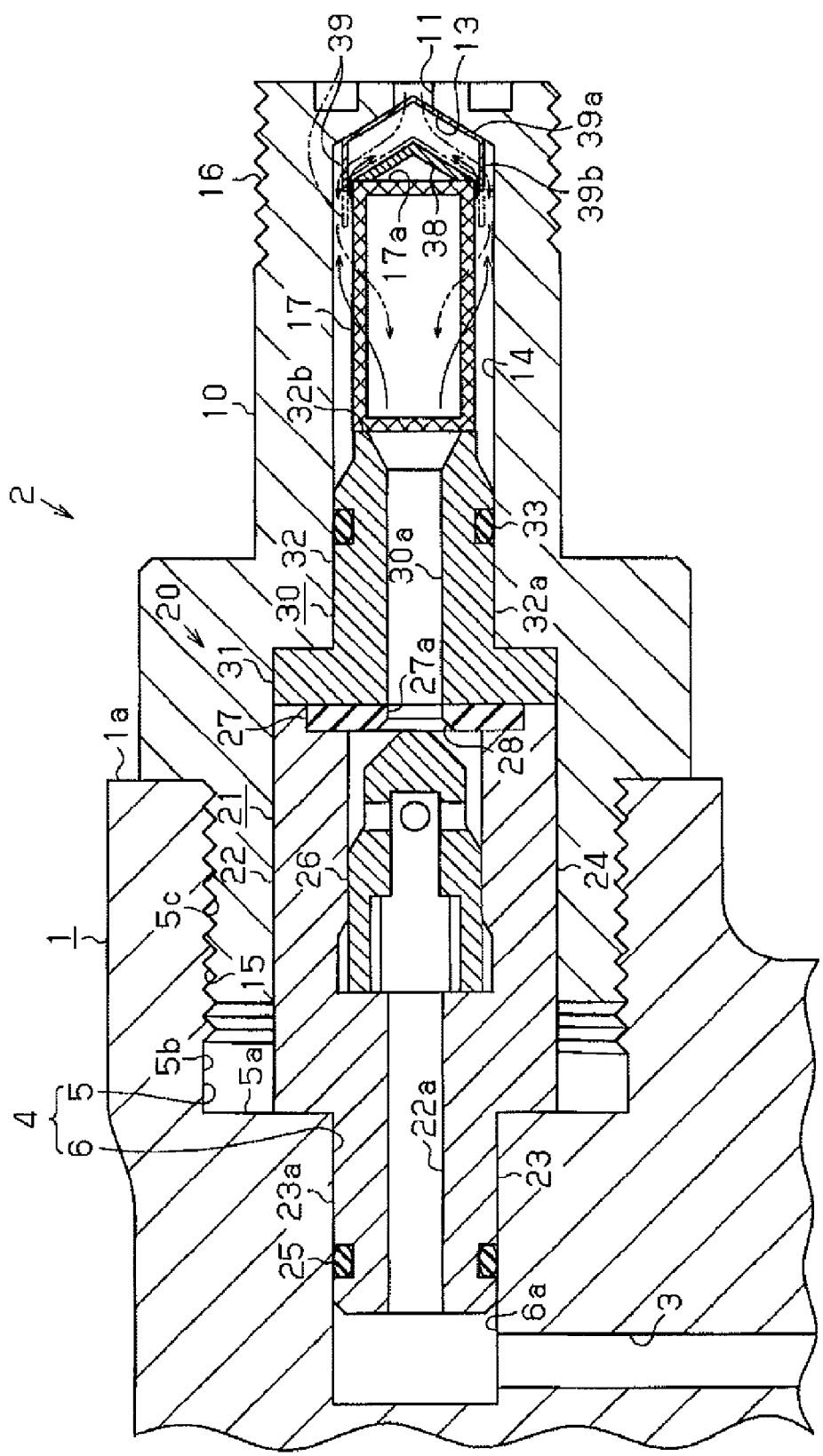
FIG. 2 is a sectional view showing a structure of a valve device according to a second embodiment.

Next, a second embodiment of the invention will be described with reference to FIG. 2. The valve device of this embodiment differs from the first embodiment in the valve element of the second check valve and the end portion 17a of the filter 17. The differences from the first embodiment will be mainly described below. The hydrogen gas and the valve element when hydrogen gas is being filled are represented by chain double-dashed lines. The hydrogen gas and the valve element when hydrogen gas flows backward are represented by solid lines.

The valve element of the second check valve is a lid body 39 including a conic portion 39a, whose shape is a circular cone shape, and a cylindrical portion 39b joined to a lower end portion of the conic portion 39a. The cylindrical portion 39b, on the inner circumferential surface thereof, is loose fitted onto the outer circumferential surface of the filter 17. When the lid body 39 moves due to the gas pressure, the cylindrical portion 39b functions as a guide and the lid body 39 moves along the outer circumferential surface of the filter 17.

A conic support portion 38 for supporting the lid body 39 when hydrogen gas is being filled is formed at the end portion 17a of the filter 17 on the filling port 11 side. The profile of the conic support portion 38 of the filter 17 fits the inner side of the conic portion 39a of the lid body 39. When hydrogen gas flows backward, the lid body 39 seats on the valve seat 13 of the filling port 11 to block the filling port 11, so that the hydrogen gas that has passed through the filter 17 is prevented from leaking to the outside through the filling port 11.

In installing the valve device 2, the valve pressing member 30 and the filter 17 are inserted into the housing 10 in a state where the lid body 39 is placed over the filter 17 and then, the housing 10 is screwed into the first recess portion 5 of the installation recess portion 4.

Next, operation of the valve device will be described. A nozzle for supplying hydrogen gas is screwed onto the portion of the filling port 11 and hydrogen gas is filled into the tank. When the hydrogen gas flows into the filling passage 3, the lid body 39 is supported by the conic support portion 38 of the filter 17 due to the pressure of the inflow gas. The hydrogen gas that flows in through the filling port 11 detours the lid body 39, passes through the filter 17, passes through the through hole 30a of the valve pressing member 30, passes through the first check valve 21, and is thus filled into the gas tank 1 through the through hole 22a of the valve element housing 22 and through the filling passage 3.

Meanwhile, when an excessive pressure occurs in the gas tank 1, the hydrogen gas in the gas tank 1 passes through the first cheek valve 21 and enters the housing portion 14 of the housing 10, in which the second check valve is provided. The hydrogen gas flows from the filter 17 toward the filling port 11, thereby pressing the lid body 39 against the valve seat 13 of the filling port 11. In this way, the lid body 39 closes the filling port 11, so that hydrogen gas is prevented from leaking to the outside through the filling port 11.

The second embodiment brings about the following operations and effects, in addition to the operations and effects of (1), (3), and (4) of the first embodiment. (5) Because the conic lid body 39 is housed in the housing 10 and the conic support portion 38 is formed at the end portion 17a of the filter 17, the lid body 39 is supported upon movement of the lid body 39 to the filter 17 side at the time of filling the hydrogen gas, for example, and it is therefore possible to suppress unnecessary movement of the lid body 39. In addition, a member for supporting the lid body 39 is not provided separately but provided on the filter 17, so that the space required for installation is reduced.

(6) The cylindrical portion 39b that is loose fitted onto the outer circumferential surface of the filter 17 is formed at the lower end portion of the conic lid body 39. Thus, when the lid body 39 moves to the filter 17 side at the time of filling the hydrogen gas, the cylindrical portion 39b functions as a guide and the cylindrical portion 39b moves along the outer circumferential surface of the filter 17, so that the lid body 39 moves smoothly.

The above-described embodiments may be also implemented in the following forms that are obtained by appropriately modifying the above embodiments.

Figure 3:
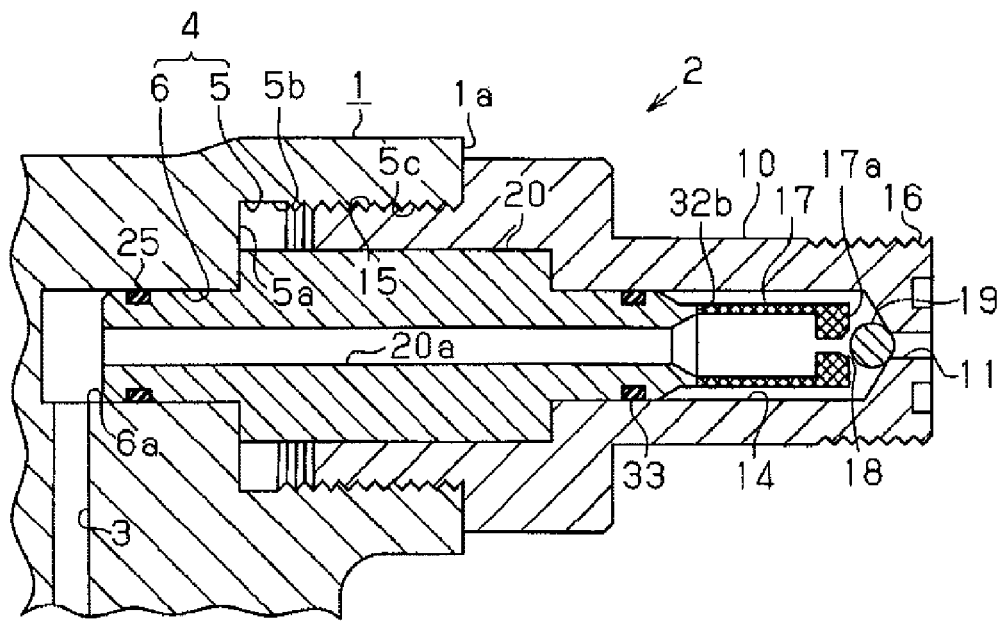
FIG. 3 is a sectional view showing a structure of a valve device according to another embodiment.
Figure 4:
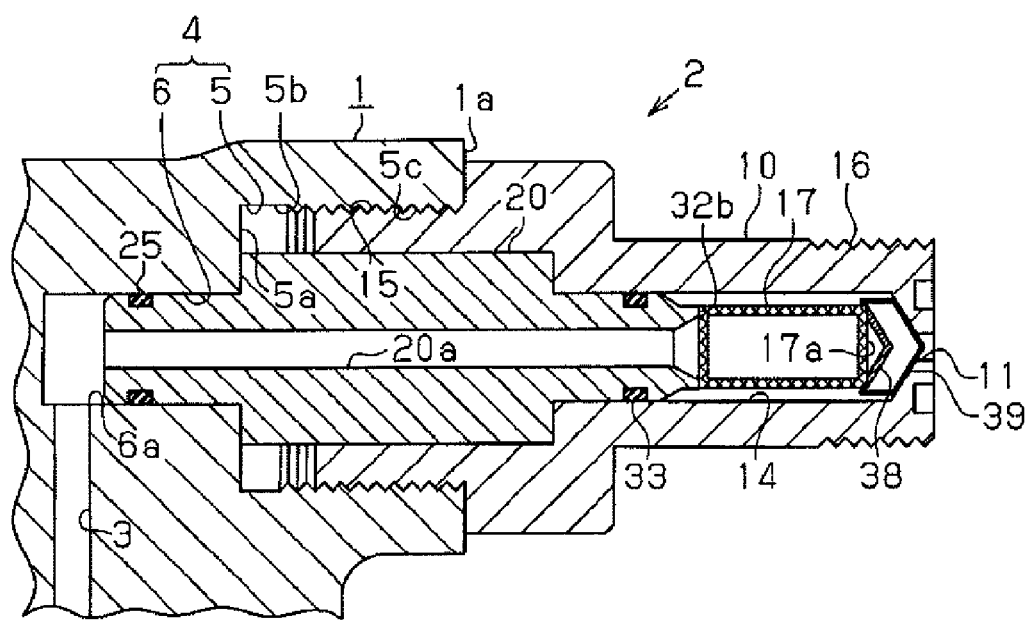
FIG. 4 is a sectional view showing a structure of a valve device according to another embodiment.

In the above-described configuration, the first check valve 21 may be omitted as shown in FIGS. 3 and 4. Specifically, a configuration may be employed, in which: the valve element 26 of the first check valve 21 is omitted; the passage member 20 is provided, into which the valve element housing 22 and the valve pressing member 30 are united; and a through hole 20a, through which the filling passage 3 and the housing portion 14 communicate with each other, is formed in the passage member 20. With this configuration, the structure is further simplified.

In the above second embodiment, a configuration may be employed, in which the cylindrical portion 39b of the lid body 39 is omitted.

Although, in the above second embodiment, the conic support portion 38 of the filter 17 is a member separate from the filter 17, the conic support portion 38 may be formed integrally with the filter 17.

Although, in the above embodiments, in the housing portion 14, the spherical valve element 19 is provided as the valve element in the case of the first embodiment and the lid body 39 is provided as the valve element in the case of the second embodiment, a member that has another shape may be used as the valve element as long as the member can be provided between the filter 17 and the filling port 11 and closes the filling port 11 when hydrogen gas flows backward. It is preferable that the shape of the end portion 17a of the filter 17 be also changed in accordance with the shape of the valve element.

Although, in the valve devices of the above-described embodiments, the housing 10 etc. are provided at the installation recess portion 4 of the gas tank 1, a plug housing may be provided on the gas tank 1 and a plurality of valve devices each including the filling passage as described above may be provided in the plug housing.

What is claimed is:

1. A valve device that is installed on a gas tank and opens and closes a gas passage, comprising:
    a housing having a housing space; and
    a passage member that is fixed to the housing and has a through hole, through which the housing space and the gas passage communicate with each other, wherein:
    the housing has a filling port, through which the housing space and an outside of the valve device communicate with each other;
    the housing space contains a filter, disposed between the filling port and the through hole of the passage member, for filtering a gas that is filled into the gas tank through the filling port and a valve element disposed between the filter and the filling port, the valve element being moved between the filter and the filling port by a flow of the gas; and
    a recess portion for holding the valve element that directly contacts an end portion of the filter,
    wherein, when the gas in the gas tank passes through the through hole and the filter and flows into the housing space, the valve element moved toward the filling port seats on a valve seat formed around the filling port and closes the filling port.

2. The valve device according to claim 1, wherein the valve element is a spherical valve element.

3. The valve device according to claim 2, wherein
    the housing is screwed into an installation recess portion that communicates with the gas passage, and
    the passage member is fixed to the installation recess portion in a pressed state via the housing that is screwed into the installation recess portion.

4. The valve device according to claim 3, wherein
    a check valve that prevents the gas from flowing backward is disposed in the passage member.

5. The valve device according to claim 2, wherein
    a check valve that prevents the gas from flowing backward is disposed in the passage member.

6. The valve device according to claim 2, wherein the gas tank stores high-pressure hydrogen gas.

7. The valve device according to claim 1, wherein
    the housing is screwed into an installation recess portion that communicates with the gas passage, and
    the passage member is fixed to the installation recess portion in a pressed state via the housing that is screwed into the installation recess portion.

8. The valve device according to claim 7, wherein
    a check valve that prevents the gas from flowing backward is disposed in the passage member.

9. The valve device according to claim 7, wherein the gas tank stores high-pressure hydrogen gas.

10. The valve device according to claim 1, wherein
    a check valve that prevents the gas from flowing backward is disposed in the passage member.

11. The valve device according to claim 10, wherein the gas tank stores high-pressure hydrogen gas.

12. A valve device that is installed on a gas tank and opens and closes a gas passage, comprising:
    a housing having a housing space; and
    a passage member that is fixed to the housing and has a through hole, through which the housing space and the gas passage communicate with each other, wherein:
    the housing has a filling port, through which the housing space and an outside of the valve device communicate with each other;
    the housing space contains a filter, disposed between the filling port and the through hole of the passage member, for filtering a gas that is filled into the gas tank through the filling port and a valve element disposed between the filter and the filling port, the valve element being moved between the filter and the filling port by a flow of the gas; and
    a cylindrical portion that is loose fitted onto an outer circumferential surface of the filter is formed at an end portion of the valve element on a side closer to the filter,
        wherein the cylindrical portion directly contacts the end portion of the filter, and
        wherein, when the gas in the gas tank passes through the through hole and the filter and flows into the housing space, the valve element moved toward the filling port seats on a valve seat formed around the filling port and closes the filling port.

13. The valve device according to claim 12, wherein
    the valve element is a hollow lid body whose shape is a circular cone shape.

14. The valve device according to claim 13, wherein
    the housing is screwed into an installation recess portion that communicates with the gas passage, and
    the passage member is fixed to the installation recess portion in a pressed state via the housing that is screwed into the installation recess portion.

15. The valve device according to claim 14, wherein
    a check valve that prevents the gas from flowing backward is disposed in the passage member.

16. The valve device according to claim 13, wherein
a check valve that prevents the gas from flowing backward is disposed in the passage member.

17. The valve device according to claim 12, wherein
the housing is screwed into an installation recess portion that communicates with the gas passage, and
the passage member is fixed to the installation recess portion in a pressed state via the housing that is screwed into the installation recess portion.

18. The valve device according to claim 17, wherein
a check valve that prevents the gas from flowing backward is disposed in the passage member.

19. The valve device according to claim 12, wherein
a check valve that prevents the gas from flowing backward is disposed in the passage member.

20. The valve device according to claim 12, wherein the gas tank stores high-pressure hydrogen gas.

* * * * *